United States Patent
Watanabe et al.

[11] Patent Number: 5,829,022
[45] Date of Patent: Oct. 27, 1998

[54] METHOD AND APPARATUS FOR MANAGING COHERENCY IN OBJECT AND PAGE CACHES

[75] Inventors: Yoshiki Watanabe; Hiroshi Hayata, both of Nakai-machi, Japan

[73] Assignee: Fuji Xerox Co., Ltd., Tokyo, Japan

[21] Appl. No.: 632,069

[22] Filed: Apr. 15, 1996

[30] Foreign Application Priority Data

Aug. 29, 1995 [JP] Japan .................................. 7-243671

[51] Int. Cl.⁶ ............................ G06F 12/00; G06F 13/00
[52] U.S. Cl. ........................ 711/118; 711/144; 711/141; 711/154; 707/100; 707/103
[58] Field of Search ...................... 364/DIG. 1; 395/445, 395/449, 614, 481, 471; 365/49; 711/118, 122, 144, 141, 146, 154; 707/100, 103

[56] References Cited

U.S. PATENT DOCUMENTS

| | | | |
|---|---|---|---|
| 4,969,122 | 11/1990 | Jensen | 365/49 |
| 5,043,871 | 8/1991 | Nishigaki et al. | 395/618 |
| 5,060,144 | 10/1991 | Sipple et al. | 395/726 |
| 5,206,941 | 4/1993 | Eikill et al. | 395/445 |
| 5,237,661 | 8/1993 | Kawamura et al. | 395/250 |
| 5,261,069 | 11/1993 | Wilkinson et al. | 395/445 |
| 5,353,222 | 10/1994 | Takise et al. | 395/419.17 |
| 5,369,753 | 11/1994 | Tipley | 395/449 |
| 5,377,345 | 12/1994 | Chang et al. | 395/445 |
| 5,426,747 | 6/1995 | Weinber et al. | 395/400 |
| 5,450,563 | 9/1995 | Gregor | 395/403 |
| 5,493,728 | 2/1996 | Solton et al. | 395/250 |
| 5,542,072 | 7/1996 | Kawashima | 395/600 |
| 5,548,740 | 8/1996 | Kiyohara | 395/427 |
| 5,586,290 | 12/1996 | Hirai et al. | 395/440 |
| 5,615,362 | 3/1997 | Jensen et al. | 395/614 |

FOREIGN PATENT DOCUMENTS

A-5-225034  9/1993  Japan .

OTHER PUBLICATIONS

Building an Object–Oriented Database System, Chapter 8, (1992) "Three Alternative Workstation–Server Architectures", David J. Dewitt et al., pp. 411–446.

IEEE Transactions of Software Engineering, vol. 18, No. 8, Aug. 1992, "Working with Persistent Objects: To Swizzle or not to Swizzle", J. Eliot et al., pp. 657–673.

*Primary Examiner*—Tod R. Swann
*Assistant Examiner*—Tuan V. Thai
*Attorney, Agent, or Firm*—Oliff & Berridge, PLC

[57] ABSTRACT

To reduce process time by simplifying the cache status and to improve the execution efficiency of the application program in the separate region conversion system that is capable of maintaining the hit rate of the cache at high level. When an access request is made to the object and if the object is not stored in the object cache, the page containing the object is read from the database and is stored in the page cache, and the object is read from the page and stored in the cache. The status of the page cache describing the status of the page stored in the page cache is stored in the page status storage device and at the same time the status of the object cache describing the status of the object stored in the object cache is stored in the object status storage device. By establishing a relationship between the status of the page cache and the status of the object, if the status of the page cache and the corresponding status of the object cache are not consistent, the status synchronizing device executes a synchronization process to make these status consistent.

15 Claims, 13 Drawing Sheets

METHOD AND APPARATUS FOR MANAGING COHERENCY IN OBJECT AND PAGE CACHES

BACKGROUND OF THE INVENTION

1. Field of the Invention

The present invention relates to an apparatus and method used to execute cache management in an object oriented database. More particularly, the present invention relates to a technology used to manage the status of the page and object that are stored in the cache.

2. Description of Related Art

In an object oriented database management system of the server/client type, a page/server system is commonly used in which data transfer between the server and the client is performed one page at a time. The structure and method of such a system is disclosed in "Three Workstation-Server Architectures", *Building an Object-Oriented Database System*, Morgan Kaufman, 1992, pp 411–446, the subject matter of which is incorporated herein by reference.

According to this method, if the client applies an appropriate lock to the page in transferring a page from the server to the client (workstation), the server reads the page from the disk (i.e., a secondary recording apparatus) as needed and transfers the page to the client. In order to update the contents of certain objects, the page in which the object is contained must be again transferred from the server to the client.

The contents of the object in the page that is transferred to the client is in a description format suitable to be stored in the storage apparatus (hereafter storage format). Hence, in order to process the object with a client application program it is necessary to convert the format to a description format that can be used in the process by the application program (hereafter computable format).

There are two conventional conversion methods disclosed in "Working with Persistent Object: To Swizzle or Not to Swizzle", *IEEE Transactions on Software Engineering*, J. Eliot B. Moss, Vol. 18, No. 8, 1992), the subject matter of which is incorporated herein by reference. One of the methods (hereafter on-site conversion system) converts the object contained in the page to the computable format in the buffer region (hereafter page cache) that stores the storage format page read in the client. The other method provides a buffer region (hereafter object cache) separate from the page cache to store the object in computable format. In transferring the object from the page in storage format stored in the page cache to the object cache, the object is converted to the computable format and is stored in the object cache (hereafter separate region conversion system).

In order for the application program of the client to use the object, it is necessary to monitor whether the object in computable format has the same content as the corresponding object contained in the page in storage format so that the conformity of the contents of the same object are assured. Such a monitoring method is disclosed in Japanese Laid-Open Patent Publication Hei 5-225034, the subject matter of which is incorporated herein by reference, where the status of the object stored in the object cache is monitored. Different processes are used depending on whether the object status is valid or invalid.

In other words, in this method the object stored in the object cache includes a volatile object region corresponding to the data section of the object and a handler region corresponding to the management information section of the object. A region is provided in the handler region where validity of the volatile object is indicated. When the lock is applied to the object for accessing, after examining the region in the handler region in which validity of the object is indicated, the data in the volatile object is used by the application program without change if the object is valid. However, if the object is not valid, the object is read again from the secondary storage device or from the page cache and the content of the object is conformed and then used by the application program.

In comparing the above-described on-site conversion system and the separate region conversion system, the on-site conversion system has a problem that the execution efficiency of the application program declines because the entire object contained in the page is purged when the cache overflows and purges the page in the page cache from the cache to cause the hit rate of the cache to drop drastically. On the other hand, in the separate region conversion system, the object stored in the object cache continues to be stored in the object cache even if they are contained in the page in the page cache that is purged from the cache to prevent a condition where the hit rate of the cache drops drastically.

However, the separate region conversion system is made to store the page in storage format and the object in computable format separately in the page cache and the object cache. The cache status (the conformity of the contents of the object and the page) must be monitored. Otherwise, the application program cannot use the object without a failure. Hence, the status of the page cache and the status of the object cache must be monitored. However, in monitoring these cache status separately, the number of status equivalent to the combination of both status must be monitored. This complicates the monitoring process as well as increases the time required for monitoring to thereby reduce the execution efficiency of the application program.

SUMMARY OF THE INVENTION

It is an object of the present invention to improve the execution efficiency of the application by simplifying the monitoring of the cache status and by reducing the processing time in the separate region conversion system that is capable of maintaining the hit rate of the cache at high level.

When the access request to the object is made so that the object can be used in the application program, the page containing the object is read from the page and is stored in the page cache. The object for which the access request is received is read from the page and stored in the object cache if the object is not stored in the object cache. Moreover, the page cache status, which indicates whether the page stored in the page cache is consistent with the corresponding page in the database, is stored in a page status storage device. The object cache status, which indicates whether the object stored in the object cache is consistent with the corresponding object in the database, is stored in the object status storage device.

The page cache status stored in the page status storage device and the object cache status stored in the object status storage device regarding the object read from the page are correlated and monitored. If the page cache status and the corresponding object cache status are inconsistent, the status synchronization device performs a synchronization process to make these status consistent with each other.

The synchronization process may be performed each time the access to the object is requested. The process may include a step to determine, by the database determination device, whether the page stored in the page cache containing the object for which access is requested is consistent with the page in the database corresponding to the page. In the case of inconsistency, the page cache status stored in the page status storage device is set to be invalid by the status update device indicating the inconsistency with the database. In addition, the object cache status is stored in the object status storage device corresponding to the object read from the page and stored in the object cache to be invalid indicating that the page is not guaranteed to be consistent with the corresponding object in the database.

The present invention is structured not only as an object oriented database management system by use of a single information processing apparatus, but also as a server/client type database management system.

The present invention utilize correlation between the page in the page cache and the object in the object cache. By synchronizing these status, the number of status to be considered during cache management is restricted to improve the efficiency of cache management. Moreover, until these status are synchronized, the content stored in the page cache and the content stored in the object cache can be managed independently. Hence, the page in which the object exists can be purged with the object remaining in the object cache to enable a high level of cache usage efficiency and a high level of hit rate.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which the reference numerals refer to like elements and wherein.

DETAILED DESCRIPTION OF PREFERRED EMBODIMENTS

Figure 1:
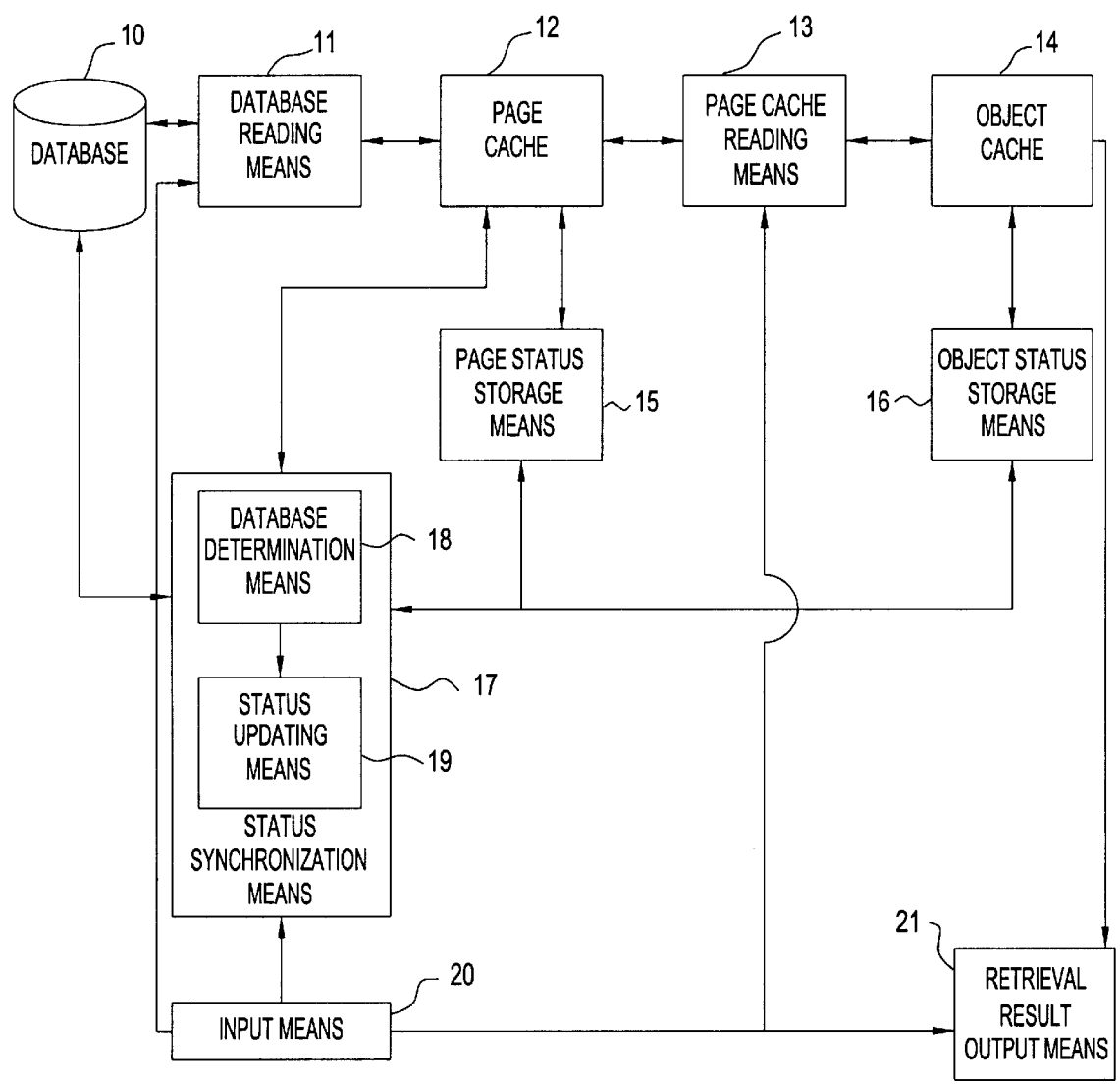
FIG. 1 is a structure of the database management apparatus of the present invention.

A structure of the database management apparatus of the present invention is described with reference to FIG. 1.

The database management apparatus includes a database 10 that stores a page containing several objects, a database reading device 11 that reads a page containing the object corresponding to an access request from the database 10, a page cache 12 that stores the page read, a page cache reading device 13 that reads the object corresponding to the access request from the page cache 12, an object cache 14 that stores the object read and a page status storage device 15 that stores the page cache status of the page stored in the page cache 12. An object status storage device 16 stores the object cache status of the object stored in the object cache 14 and a status synchronizing device 17 performs the synchronization process to make the page cache status stored in the page status storage device 15 conform with the object cache status stored in the object status storage means 16. An input device 20 inputs the access request and a retrieval result output device 21 outputs and displays the access result on a display.

The database 10 includes a secondary memory device such as a magnetic disk device that can read and write freely. Numerous pages are stored that are data with fixed length containing several objects.

To do this, the page cache reading device 13 converts the data format in reading the object.

The page cache 12 and the object cache 14 include an internal memory device such as RAM that can read and write freely. The page cache 12 stores a page in storage format while the object cache stores the object that is converted to a computable format. In this embodiment, the page cache reading device 13 converts the object in the storage format to the object in the computable format, when the object is read from the page cache 12.

The page status storage device 15 and the object status storage device 16 also include an internal memory device such as RAM that can read and write freely and store the page cache status and the object cache status of the page stored in the page cache 12 and the object stored in the object cache 14.

These devices 12, 14, 15, 16 are structured in arbitrary form such as dividing the region into the same internal memory device or dividing the region into separate internal memory devices.

The status synchronizing device 17 is used to make the page cache status that is stored in the page status storage device 15 corresponding to the page stored in the page cache 12 containing the object for which the access request is received when the access request to the object is received is consistent with the object cache status that is stored in the object status storage device 16 corresponding to the object that is read from the page and stored in the object cache 14 and includes the database determination device 18 and the status update device 19 to execute the synchronization process.

The database determination device 18 determines whether the content of the page containing the object stored in the page cache 12 for which an access request is received is consistent with the content of the page in the database 10 corresponding to the page.

When the database determination device 18 determines inconsistency, the status update device 19 sets the page cache status of the page to be stored in the page status storage device 15 to be invalid indicating that the content of the page is not consistent with the content of the page in the database and further sets the object cache status that is stored in the object status storage device 16 corresponding to the object read from the page and stored in the object cache 14 to be invalid indicating that the content of the page is not consistent with the content of the corresponding object in the database 10.

The page status storage device 15 can set a page cache status in addition to invalid status indicating inconsistency, valid status indicating consistency and unlock status indicating that an access request is not received for the object contained in the page. The object status storage device 16 can set a object cache status, invalid status indicating inconsistency, valid status indicating consistency and uninitialized status indicating that a region is secured in the object cache 14 to read the object. The status update device 19 executes updating and synchronization for these status as well as manages the page cache status and the object cache status based on the result of determination by the database determination device 18.

The input device 20 includes a keyboard and a mouse for a user to input an access request and an interface to input access requests from the application program that uses the object.

The retrieval result output device 21 is used when the retrieval request is input by the user as an access request and retrieves the object from the object cache 14 corresponding to the retrieval request and outputs a retrieval result after the synchronization process of the status synchronizing device 17 based on the fact that the object cache status stored in the object status storage device 16 is consistent with the content of the corresponding object in the database 10 for the object corresponding to the retrieval request.

Figure 2:
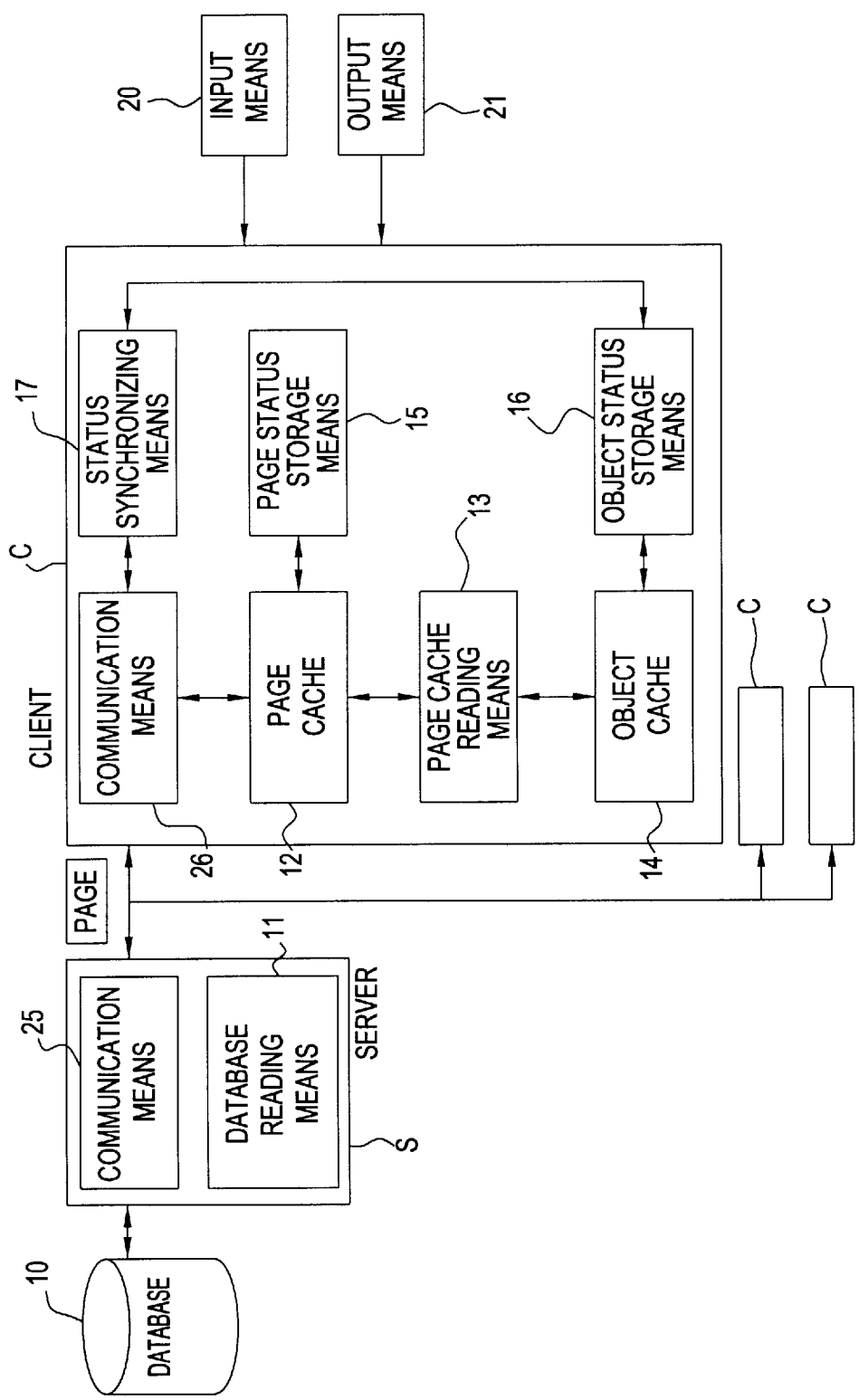
FIG. 2 is a structure of the database management apparatus in which the database management apparatus includes a server/client type database management system.

FIG. 2 is a database management apparatus that is structured as a server/client type system and an example of a database management apparatus structured as a server/client type.

The server S that directly accesses the database 10 includes a database reading device 11 and a communication device 25 that sends and receives a page to and from the client C through the network.

The client C that directly accesses the object includes the page cache 12, the page cache reading device 13, the object cache 14, the page status storage device 15, the object status storage device 16, the status synchronizing device 17, the input device 20, the retrieval result output device 21 and a communication device 26 that sends and receives the page to and from the server S through the network.

In such a server/client type structure, when the client C uses certain objects stored in the database 10, the client C requests the server S to read the page that contains the object through the network. The server S reads the page requested by the client C from the database 10 and transfers the content to the client C.

Figure 3:
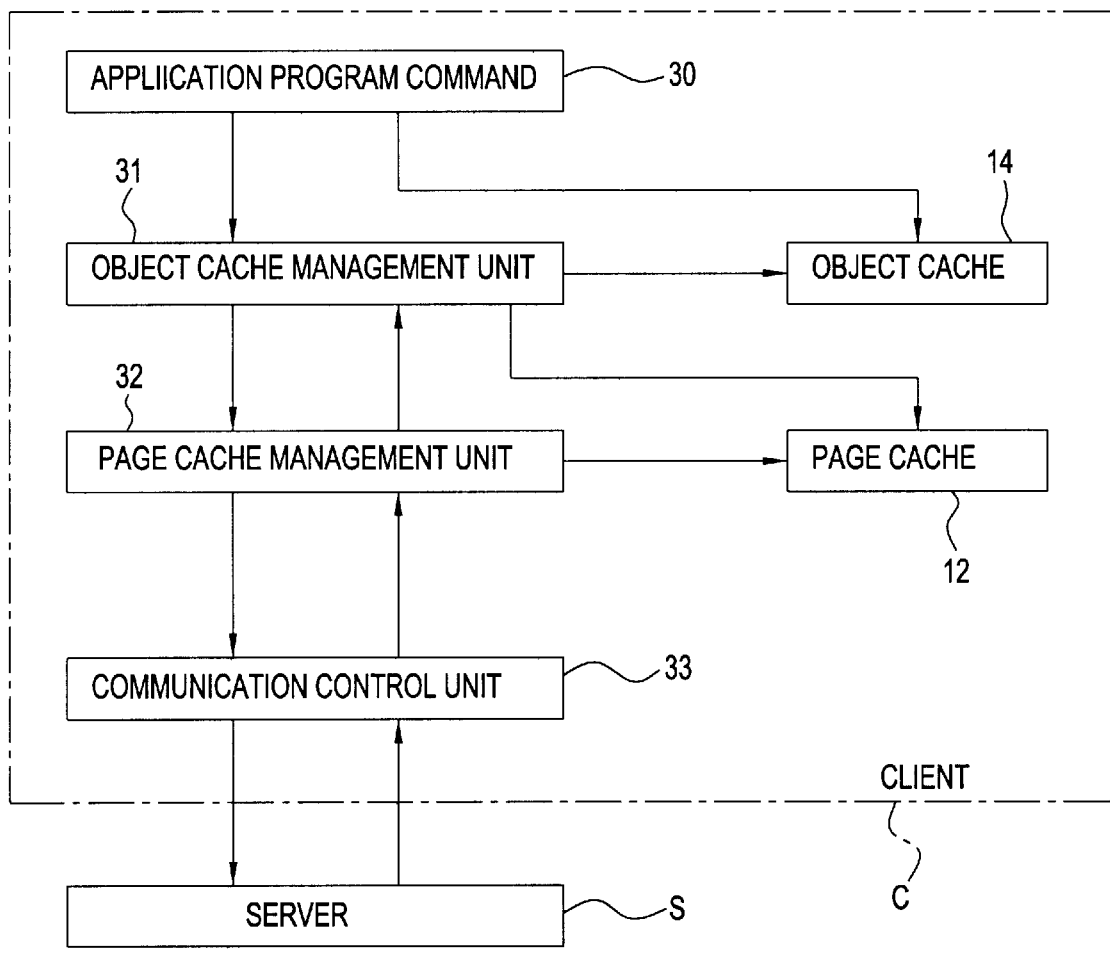
FIG. 3 is a structure relating to the cache management of the client.

The structure of the client C can be divided into various functional elements as shown in FIG. 3. The client C includes the application program 30 that uses (references) the object in computable format stored in the object cache 14, the object management unit 31 that manages the storage content of the object cache 14, the page cache management unit 32 that manages the page in storage format stored in the page cache 12 and the communication control unit 33 that sends and receives commands and messages from the server S.

The object cache management unit 31 contains the object status storage device 16 and the status synchronizing device 17. The object cache management unit 31 compares the storage contents of the page cache 12 based on the access request (command) from the application program 30 and issues a command to the page cache management unit 32 to execute the synchronization process and manage the status of the object stored in the object cache 14.

The page cache management unit 32 contains the page status storage device 15 and the status synchronizing device 17 and sends the commands to read the page to the server S based on commands from the object cache management unit 31. The commands to the server S and messages from the server S are sent and received using the communication control unit 33 containing the communication device 26.

Figure 4:
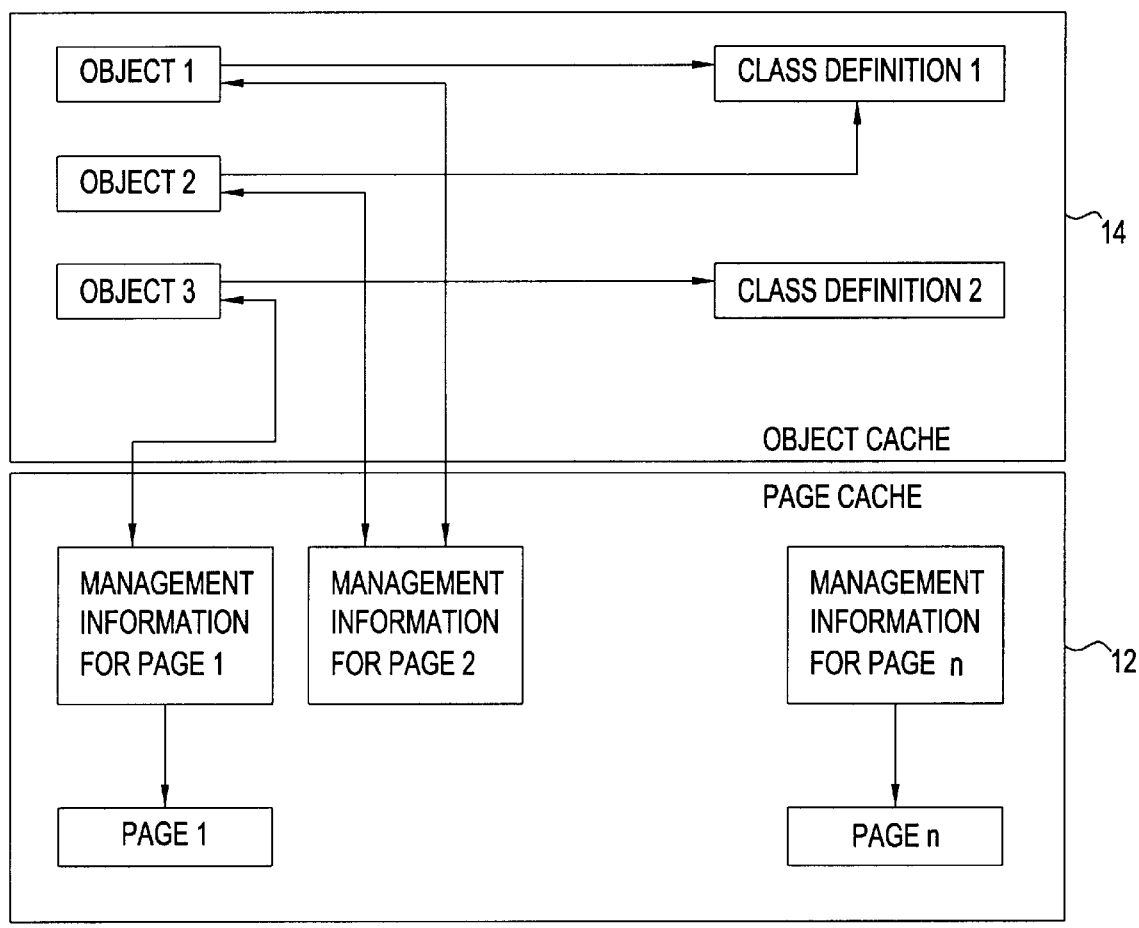
FIG. 4 shows contents stored in the object cache and the page cache.

The storage contents of the page cache 12 and the object cache 14 have a mutual relationship such as that described in FIG. 4.

The objects (1–3) that are converted to computable format are stored in the object cache 14 and the class definition (1–2) of these objects are also stored in computable format as objects. Each object references one class definition with the object 1 and object 2 referencing the class definition 1 and the object 3 referencing the class definition 2. The objects and the class definitions in the object cache 14 are managed by the object cache management unit 31 and depending on the usage condition of the object cache 14 (such as overflowing) they are purged from the object cache 14.

The contents (1-n) and the page management information of the page read from the server S are stored in storage format in the page cache 12. The management information of each page stores the location in the cache 12 of the page in question if the corresponding page exists in the page cache 12. Depending on the usage condition of the page cache 12, the content of the page is purged from the page cache 12 under management of the page cache management unit 32. However, even if the contents of the page is purged, the management information remains in the page cache 12.

Mutual referencing is established between the management information of the objects in the object cache 14 and the pages in which the objects are contained that is used in synchronizing the object status and the page status.

Figure 5:
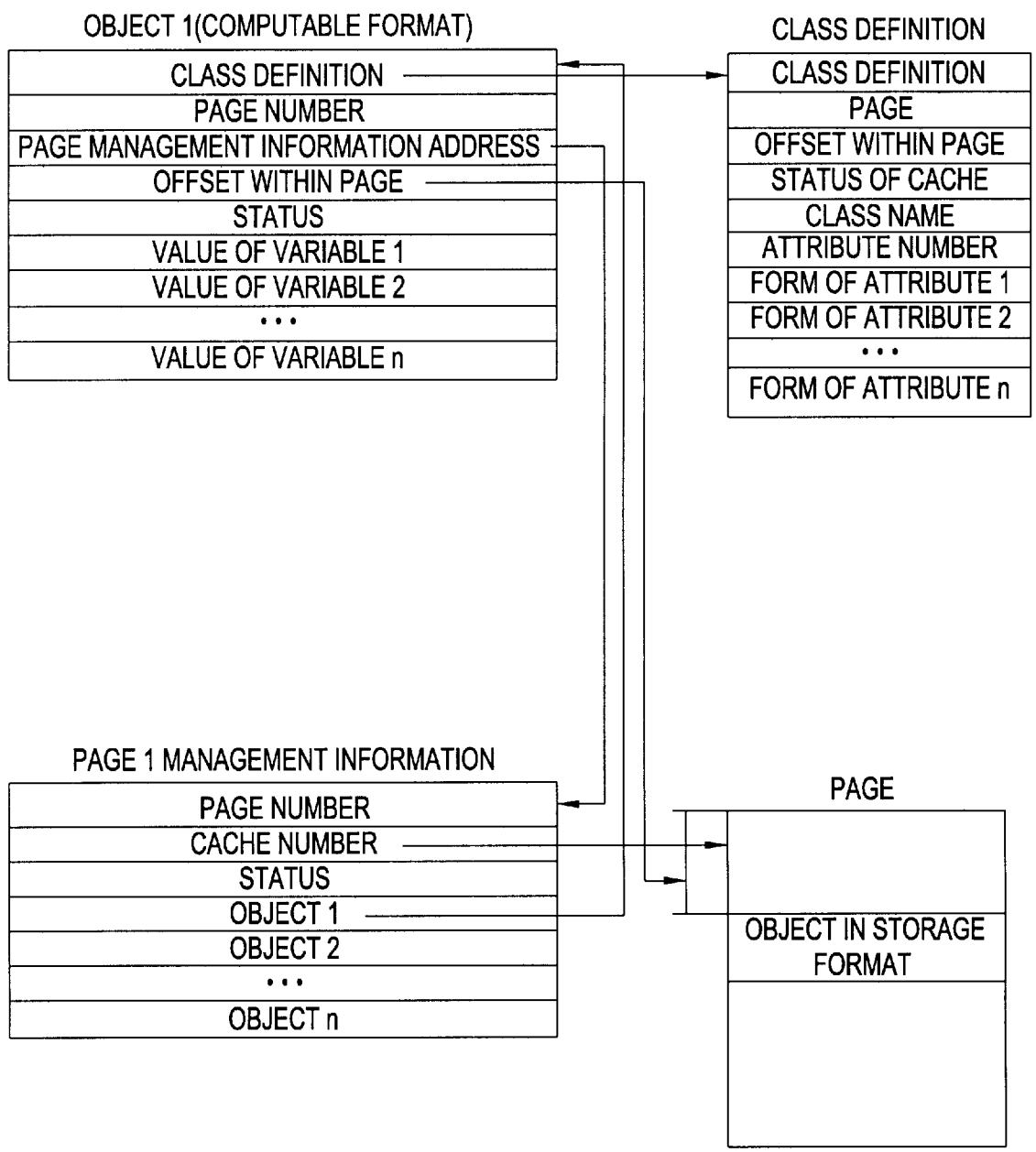
FIG. 5 is an internal structure of the management information of the object in the object cache and the page in the page cache.

FIG. 5 shows an object in computable format in the object cache 12 and the content of the management in the page cache 14 using the object 1 and the page 1 as reference.

In the region of the object 1, reference (identifier) to the class definition showing the format of the object, reference (identification number) to the page containing the object, the address to the management information of the page, the storage location (offset) of the object in the page, status of the object cache 14 and the value of each variable (data content of the object) of the object that is converted to computable format are stored.

In the region of the class definition of the object, reference (identifier) to the class definition, address to the page management information, the storage location (offset) of the object in the page and status of the object cache 14 are stored as header information like object 1. In addition, the type of the attribute (data content of the object) of the class definition is also stored.

In the region of the management information of page 1, the page number indicating the storage location of the page in the database 10, storage location (cache location) of the content of the page if the page exists in the page cache 12 and status of the page cache 12 are stored. In addition, a reference (pointer) to the object in the object cache 14 read from the page is stored.

Objects in several storage formats are stored in the region of the page stored in the page cache 12.

The regions that store the status of the objects and the object cache 14 of the class definition described above include the object status storage device 16 and the region that stores the page cache 12 of the page management information includes the page status storage device 15.

Figure 6:
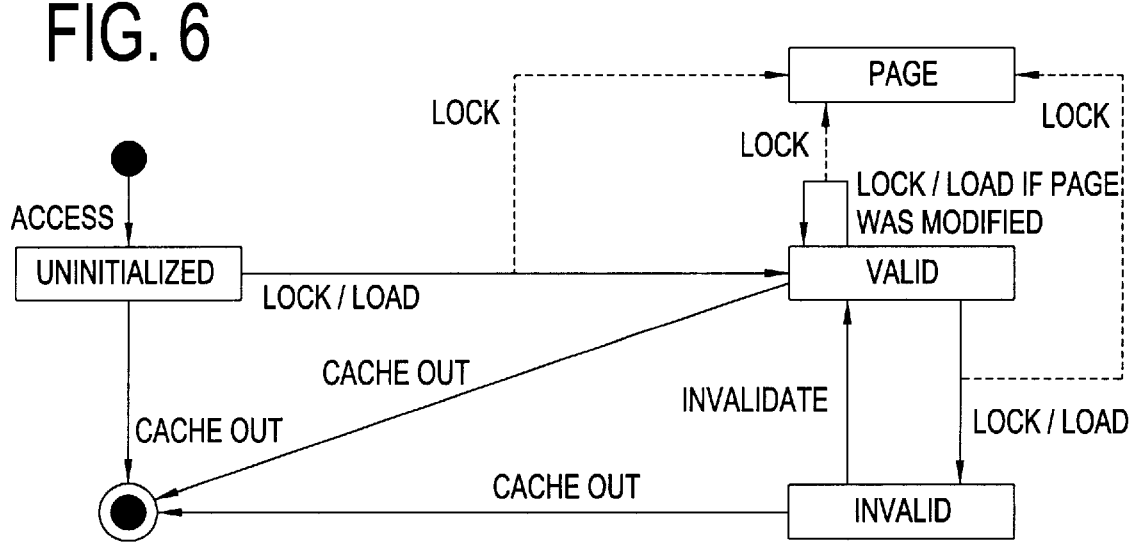
FIG. 6 shows the change in the status of the object cache.

The object cache status contained in the object and the class definition changes to invalid, valid and uninitialized according to the current conditions as described in FIG. 6.

If the object region is secured in the object cache 14 by accessing the application program 30, the status of the object cache is initialized to "uninitialized." In this status, the region of the variable of the object is not read in.

Then, when the lock is applied to the object in the object cache, the page in which the object is contained is locked, the value that is converted to computable format is read from the page cache 12 to the region of the variable values of the object in the object cache 14 and the status of the object cache changes to "valid" since the object and the content of the object stored in the object cache 14 are consistent.

Here, the status of the page cache 12 is maintained "valid" at the time of applying the lock, the "valid" status of the object cache indicates that content of the object stored in the object cache 14 are consistent with the content of the object corresponding to the page stored in the database 10 as will be explained with reference to FIG. 7.

If the lock of the page is unlocked under "valid" status with completion of the transaction, the "valid" status remains unless a next lock is applied to the object until the page in question is updated by other clients. Hence, the status does not change even with applying of the lock and the variable values in the object cache 14 are used by the application program 30 without conversion. On the other hand, if the page in question is updated by other clients by lock operation of the corresponding page based on the lock for the page, the page in storage format in the page cache 12 is read again from the database 10 and the status of the object cache 14 that stores the object read from the page changes to "invalid."

Moreover, if the updating of the corresponding page by locking the object is detected, the status of the object cache is changed to "invalid." However, if the lock is applied to the object under the status, the object in storage format in the page cache 12 is read and stored again in the object cache 14 and the status of the object cache changes to "valid."

If a need arises to form either status to secure an empty region in the object cache 14 due to the object cache becoming full, any unnecessary object is purged from the object cache 14 to free the region.

Figure 7:
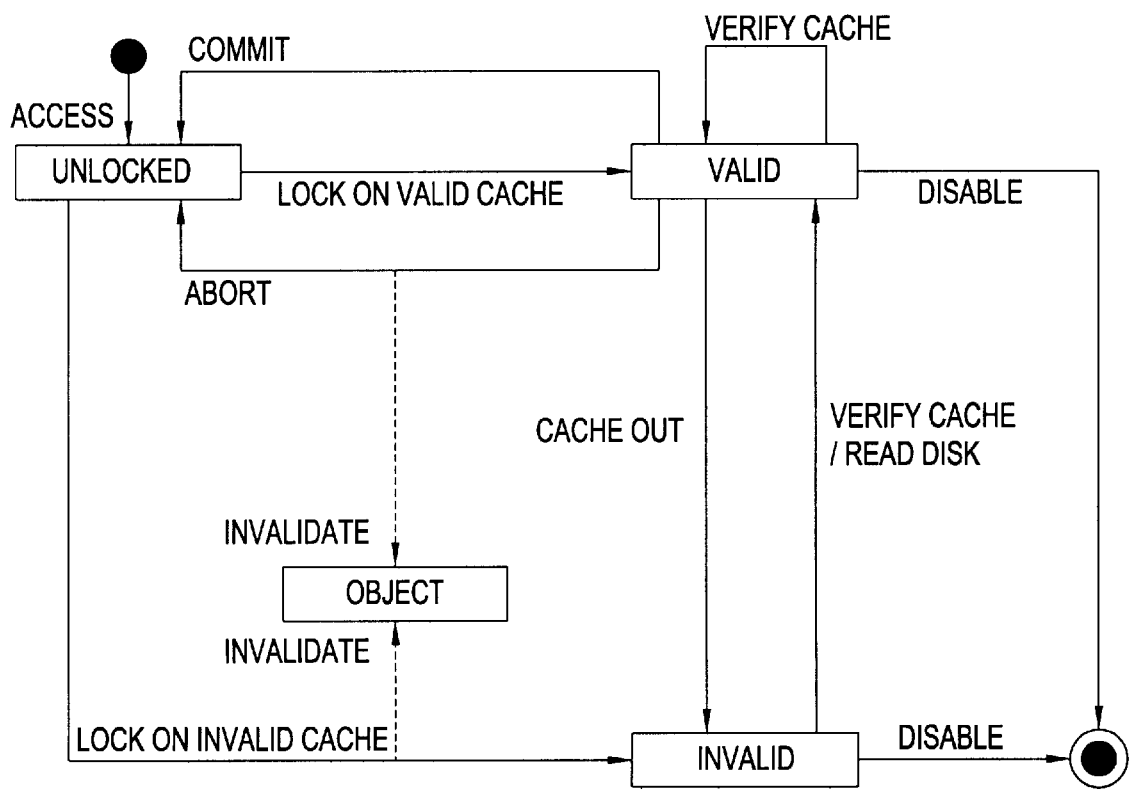
FIG. 7 shows the change in the status of the page cache.

The status of the page cache contained in the page management information changes to valid, invalid and unlocked depending on the current condition as shown in FIG. 7.

In other words, if the content of the page in the page cache 12 is secured in the page cache 12, the status of the page cache is initialized to "unlocked."

Furthermore, in the "unlocked" status, when the lock request is issued to the server S and if the content of the page cache 12 of the page is consistent with the content of the corresponding page stored in the database 10 that the server S manages, the server S notifies the client C "lock on valid cache" while "lock on invalid cache" is notified if the contents are inconsistent. With the notification, the status of the page in question in the page cache 12 changes to "valid" or "invalid." Here, if the status of the page cache changes to "invalid" the status of the object cache that references the page also changes to "invalid" but the page in the page cache 12 is read again from the database 10 during the lock operation "lock on invalid cache" and the status of the page cache changes to "valid."

In other words, the "invalid" status indicates either the page does not exist in the page cache or even if the page exists, the content of the page is different from the content stored in the database 10. Hence, the content of the latest page in question is read from the database 10 to the page cache 12 by the server S due to the lock process or other request.

On the other hand, the "valid" status indicates that the content of the page cache 12 is consistent with the content stored in the database 10. If the status of the page cache is "valid" the program ends without executing the upgrading process of the cache that is done in conjunction with the lock operation.

In the database management apparatus, the object cache management unit 31 and the page cache management unit 32 work together to execute change process in the status of the object cache and the status of the page cache and to execute synchronization to make the status of the object consistent with the status of the corresponding page cache during the change process.

Figure 8:
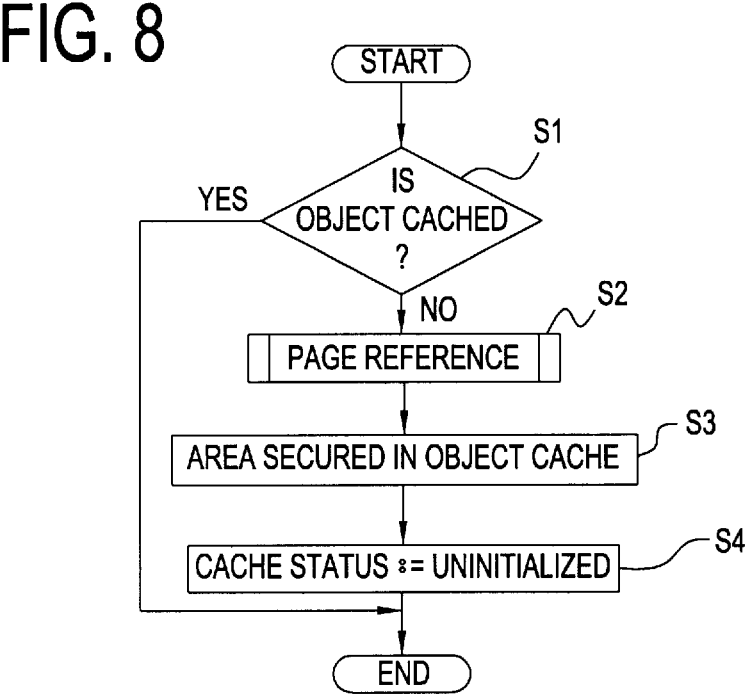
FIG. 8 is a flowchart describing the steps in the referencing process of the object.
Figure 13:
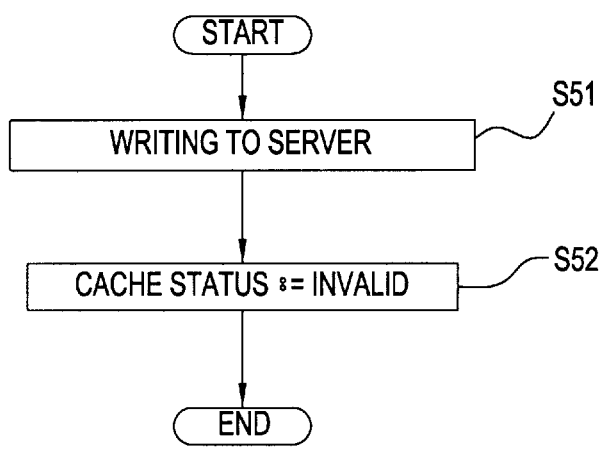
FIG. 13 is a flowchart describing the steps in the process of releasing the region of the page from the page cache.
Figure 14:
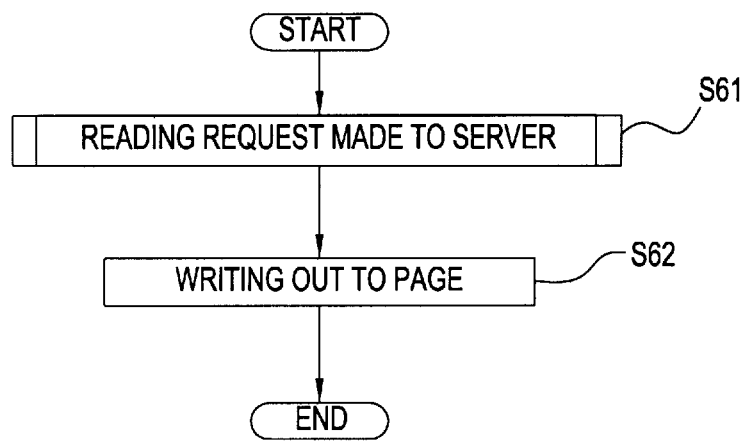
FIG. 14 is a flowchart describing the steps in the process of writing the content of the object cache to the page.
Figure 15:
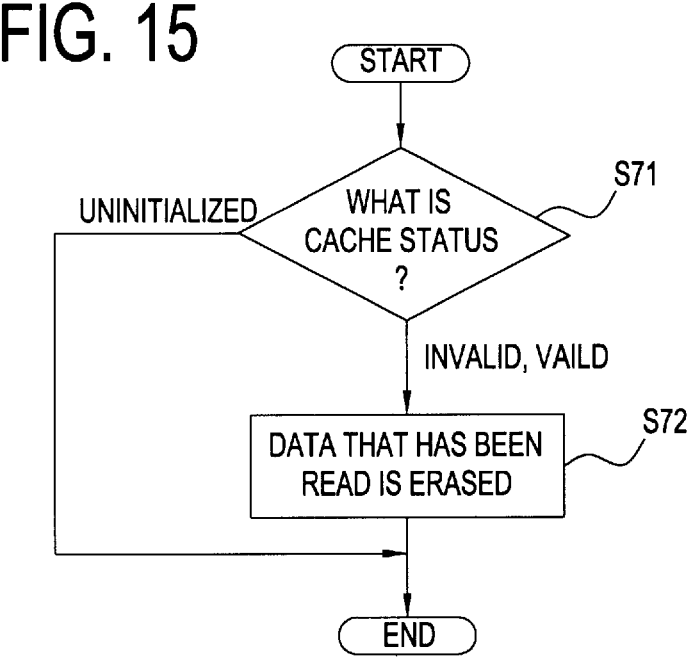
FIG. 15 is a flowchart describing the steps in the process of eliminating the object from the object cache.
Figure 16:
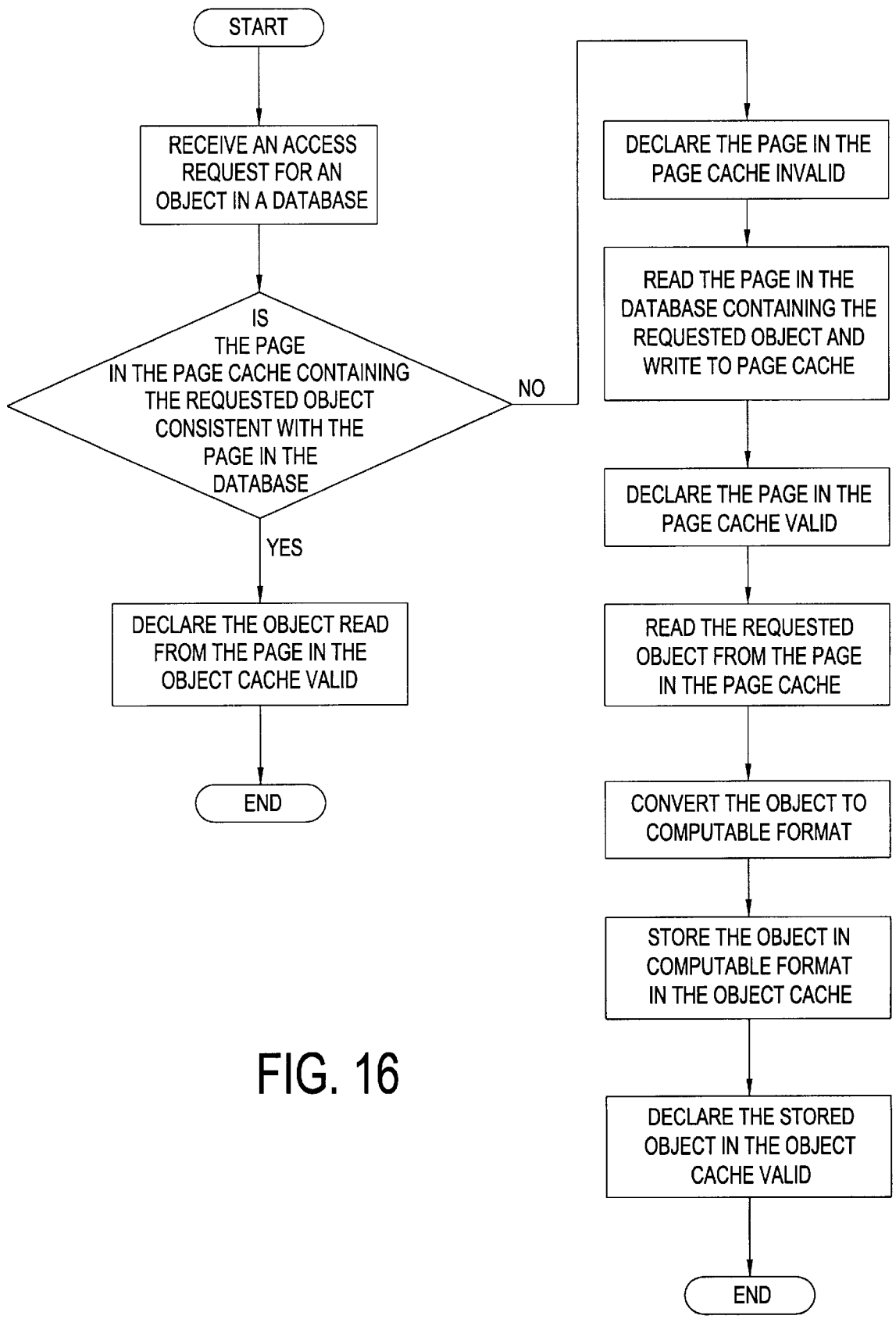
FIG. 16 is a flowchart describing the steps in the process of performing the preferred embodiment.

Next, the referencing process of the object in the object cache management unit 31 will be described with reference to FIG. 8. The referencing process of the page in the page cache management unit 32 will be described with reference to FIG. 9. The process of the object with lock being applied in the object cache management unit 31 will be described with reference to FIG. 10. The process of the page with lock being applied in the page cache management unit 32 will be described with reference to FIG. 11. The process of reading the page from the server S will be described with reference to FIG. 12. The process of releasing the page region will be described with reference to FIG. 13. The process of writing the object again to in the page will be described with reference to FIG. 14 and the process of purging the object from the cache will be described with reference to FIG. 15.

The process of referencing the object in the object cache management unit 31 is started by an access request (command) of the application program 30. Then, it is determined whether the target object exist in the object cache 14 (step S1). If the object exists, the process ends without performing any special process in the object cache management unit 31 and the application program uses the object in question. Here, the determination may be made by storing, in the object table, the identification information of the object stored in the object cache and by searching the object table as disclosed in the Japanese Laid-Open Patent Publication Hei 5-225034, the subject matter of which is incorporated herein by reference.

On the other hand, if the target object does not exist, the process referencing the page containing the object in question is started with the page number as an argument (step S2). The region is secured in the object cache 14 to store the object in question (step S3) and the process is ended after initializing the status of object cache to "uninitialized".

Figure 9:
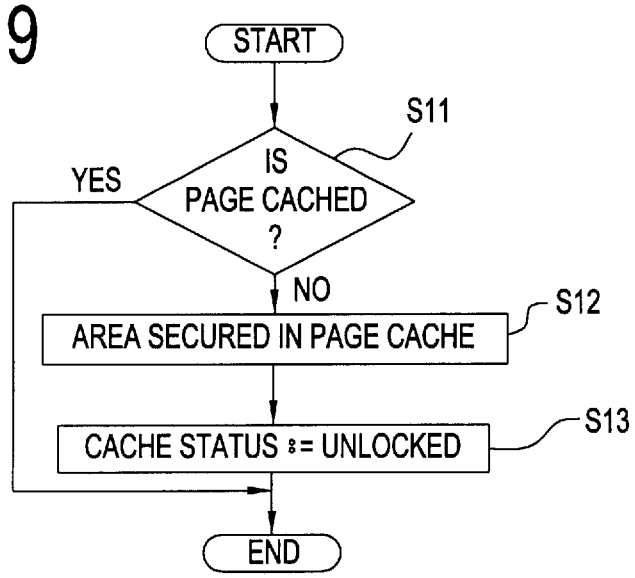
FIG. 9 is a flowchart describing the steps in the referencing process of the page.
Figure 10:
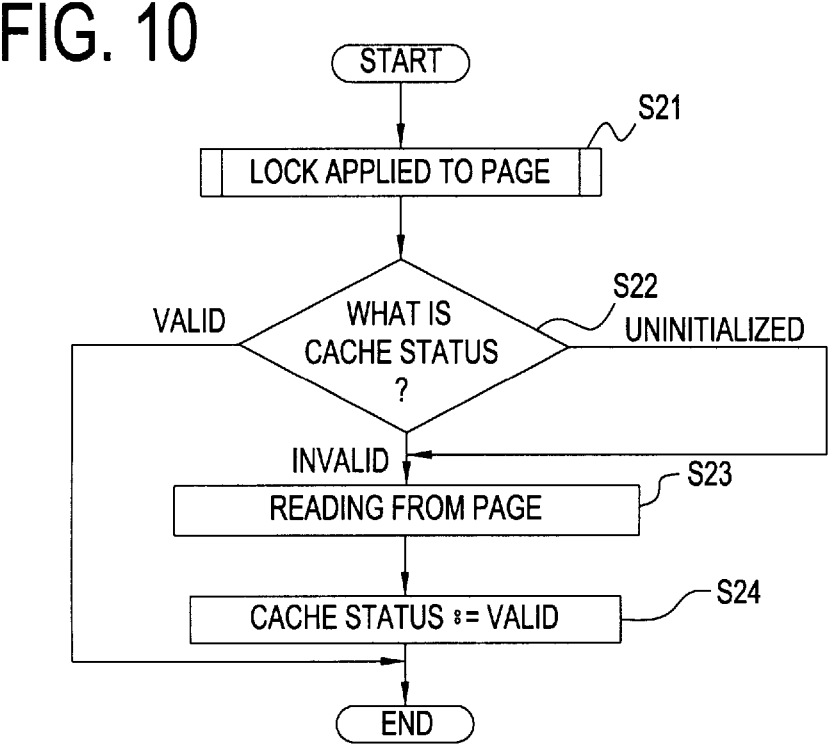
FIG. 10 is a flowchart describing the steps in the process of applying the lock to the object.

The process to reference the page described above (step S2) is executed in the page referencing process of the page cache management unit 32 (FIG. 9). By retrieving the page management information corresponding to the page number given as an argument from the page cache 12, a determination is made whether the corresponding page is cached in the page cache 12 (step S11).

As a result of the determination, if the corresponding page is cached, the process is ended at that point since the page is not needed to be read from the database 10. On the other hand, if the corresponding page is not cached, a region is secured in the page cache 12 to read the page (step S12) and the process is ended by changing the status of the page cache "unlocked" (step s13).

The process of applying the lock to the object in the object cache management unit 31 (FIG. 10) is started by the command from the application program 30. First, the process of applying the lock to the page in the page cache management unit 32 is started (step S21) and the status of the object cache 14 is determined as the result of the process (step S22). The status of the object cache may be changed during the process of applying the lock to the page. If the status is "valid" the process ends at this point. On the other hand, if the status is either "uninitialized" or "invalid," the target object in storage format is read from the page cache 12, the content of the object is read in the object cache 14 after the content is converted to a computable format (step S23) and the process is ended by changing the status of the object cache to "valid" (step 524). Here, in reading the object in the object cache 14, if the data section (variable value) of the object is data with variable length, a region to store the data is secured outside of the object in question. With such process, the lock is applied to the "valid" status.

Figure 11:
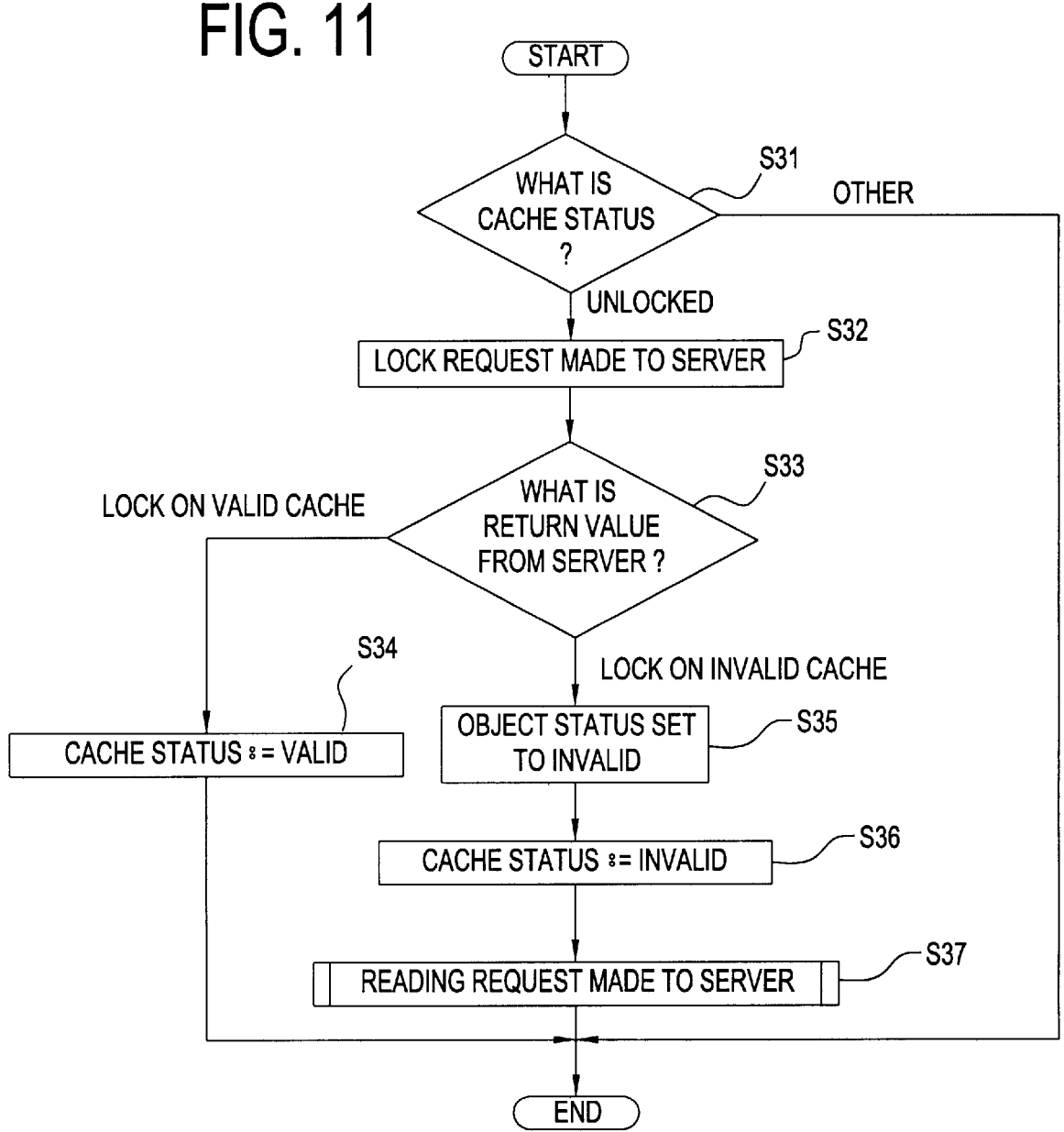
FIG. 11 is a flowchart describing the steps in the process of applying the lock to the page.

The process of applying the lock to the page (step S21) is executed in the page cache management unit 32 (FIG. 11). First, the status of the page cache is determined (step S31) and the process is ended at this point unless the status is "unlocked." On the other hand, the lock request is made to the server S through the communication control unit 33 if the status is "unlocked" (step S32).

The server S determines whether the content of the page in the page cache 12 for which the lock is to be applied is the same as the content stored in the database 10. If both contents are the same, the servers returns "lock on valid cache" to the client C indicating that the content in the cache may be used as it is and if the contents are different, it returns "lock on invalid cache" to the client C indicating the content in the cache needs to be read again.

The page cache management unit 32 receives the message from the server S through the communication control unit 33 (step S33). If the value is "lock on valid cache" ends the process by changing the status of the page cache to "valid" (step S34).

On the other hand, if the message from the server is "lock on invalid cache," the content stored in the page cache 12 is different from the content stored in the database 10. Hence, the content stored in the object cache also needs to be read again. In order to notify the need to the object cache management unit 31, the status of the object cache that stores the object being referenced by the page in question is changed to "invalid" (step S35). Moreover, the status of the page cache is also changed to "invalid" (step S36) and the process is executed to update the content of the page by sending the reading request to the server S (step S37).

During the process (step S37) based on the reading request to the server S described above, the status of the page cache is determined (step S41). If the status is "valid," the process is ended since the page is not needed to be read again from the database 10. On the other hand, if the status is "invalid," the page read from the database 10 is read from the server S to update the content of the page (step S42) and the process is ended by changing the status of the page cache to "valid" (step S43).

Figure 12:
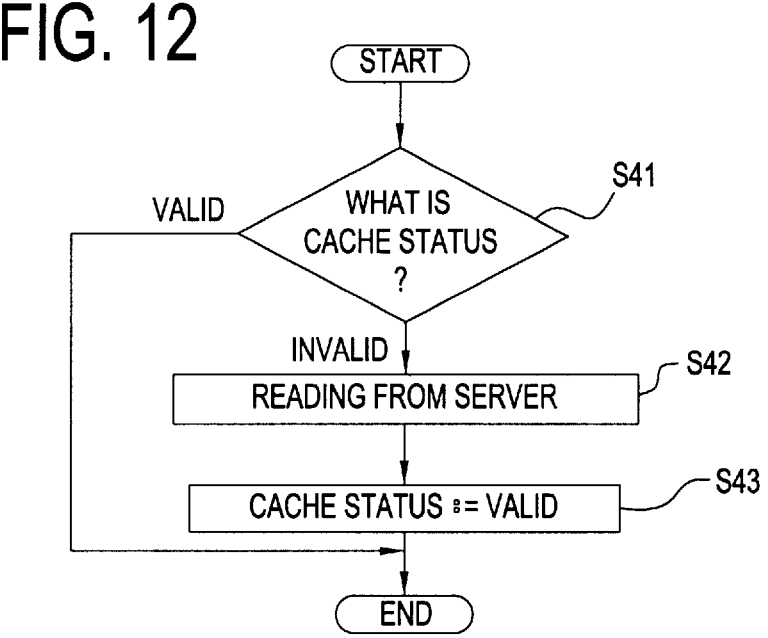
FIG. 12 is a flowchart describing the steps in the process of updating the content of the page by requesting the server to read a page.

During the process to release a region of the page from the page cache 12 at the page cache management unit 32 (FIG. 12). First, the page to be released is written from the page cache 12 to the server S (step 551) and the status of the page cache is changed to "invalid" (step S43). By doing so, when the page reading request is given to the server S next time, the process to update the content of the page shown in FIG. 12 is started and the content of the page is read newly from the server S.

Next, during the process of writing the content of the object cache 14 in the object cache management unit 31 in the page cache 12 (FIG. 14), first, the process of step S37 described above is executed by sending a reading request to the server S (step S61). Then, the corresponding page is stored again in the page cache 14 with a valid status. Thus, the region is secured in the page cache 12 for the corresponding page even if the page that should contain the target object is purged from the page cache 12.

Moreover, after the content of the target object stored in the object cache 14 is converted to storage format, the object in question is written in the page cache 12 and the process is ended (step S62).

Next, during the process of eliminating the object from the object cache 14 at the object cash management unit 31 (FIG. 15), the status of the object cache 14 is first determined (step S71). Then, if the status is "uninitialized" the process is ended at this point since there is no content to be eliminated.

On the other hand, if the status is either "invalid" or "valid," the process is ended after eliminating the value (data section) that is stored in the variable value region of the object cache 14 (step S72). Here, if the variable value is data with variable length such as character string or if the region to store the variable value is secured outside of the object, the variable value of the region is also eliminated and the region is also freed.

In the embodiment described above, a synchronization process of the status of the object cache and the status of the page cache is executed by the application program 30 accessing the object that is stored in the object cache 14. However, the synchronization process may be executed by other factors such as executing the synchronization process periodically with a predetermined time interval.

In the above-described embodiment, an example is used in which the application program 30 accesses and uses the object stored in the object cache 14 but the object may be displayed as the result of the retrieval based on the retrieval request by the user.

Furthermore, the database management apparatus of the present invention may include one information process apparatus rather than a server/client type system with equally effective operation.

As described above, the present invention utilizes the relationship between the page in the page cache and the object in the object cache. By synchronizing the status of the page cache and the status of the object cache at the time of lock operation, the number of statuses to be considered during cache management is reduced using the separate region conversion system to enable cache management with short and effective process and improve execution efficiency of the application program that utilize the object.

Moreover, because it is possible to implement the separate region conversion system, the contents stored in page cache and the object cache are managed independently until the status are synchronized and the page in which the object exists may be purged from the cache with the object remaining in the cache to increase the usage efficiency of the cache and achieve a high level of hit rate.

Other objects, advantages and salient features of the invention will become apparent from the detailed description taken in conjunction with annexed drawings, which disclose preferred embodiments of the invention.

What is claimed is:

1. A database management apparatus comprising:
    a page cache to store a page having a fixed length containing an object read from a database storing the object;
    an object cache that stores the object read from the page stored in the page cache;
    a page status information storage device to store page cache status information indicating whether the page stored in the page cache and the page on the database corresponding to the page are consistent;
    an object status information storage device to store object cache status information indicating whether the object stored in the object cache and the object on the database corresponding to the object are consistent; and
    a status information synchronizing device to execute a synchronization process in order to make the page cache status information stored in the page status storing device corresponding to the page stored in the page cache consistent with the object cache status information stored in the object status information storage device corresponding to the object that is read from the page and stored in the object cache, wherein the status information synchronizing device comprises:
        a database determination device to determine whether the page to be stored in the page cache containing the object for which the access request is received consistent with the page in the database corresponding to the pages and
        a status information updating device that sets the page status information of the page to invalid status indicating inconsistency with the database when the database determination device determines inconsistency and sets the object status information that is stored in the object status information storage device corresponding to the object read from the page and stored in the object cache to the invalid status that is a status not guaranteeing consistency with the corresponding object in the database.

2. The database management apparatus of claim 1, wherein the status information synchronizing device executes the synchronization process to make the page status information stored in the page status information storage device consistent with the object status information stored in the object status information storage device based on the results of determining whether the page stored in the page cache is consistent with the page on the database corresponding to the page.

3. The database management apparatus of claim 2, wherein the status information synchronizing device sets the object status that corresponds to all of the objects read from the page and stored in the object cache to an invalid status indicating that the objects do not necessarily correspond with corresponding objects in the database when the page status stored in the page status information storage device is set to an invalid status indicating that the page stored in the page cache is inconsistent with the page in the database corresponding to the page.

4. The database management apparatus of claim 1, wherein the page cache stores the page in a storage format that is suitable to store the data, the object cache storing the object in a computable format that is suitable to process data, the database management apparatus further comprises a conversion device to read the object in storage format from the page cache, to convert the format to computable format and to store the format in the object cache.

5. The database management apparatus of claim 1, wherein the page status information storage device contains, as a page status information, a valid status that indicates that the page stored in the page cache is consistent with the page stored in the database corresponding to the page, an invalid status that indicates inconsistency and a unlock status that indicates that the access request is not received for the object contained in the page, wherein the object status information storage device contains, as object status information, a valid status that indicates that the object stored in the object cache is consistent with the object stored in the database corresponding to the object, an invalid status that indicates inconsistency and an uninitialized status that indicates that a region is secured in the object cache to read an object.

6. The database management apparatus of claim 1, wherein when the status information synchronizing device receives an access request for the object, the status information synchronizing device makes the page status information that is stored in the page status information storage device corresponding to the page stored in the page cache including the object for which the access request is received consistent with the object status information that is stored in the object status information storage device corresponding to the object read from the page and stored in the object cache.

7. A database management apparatus comprising:
    a database reading device to read a page that includes data of a fixed length containing the object for which the access request is received from a database in response to the access request to the object stored in the database that stores the object;
    a page cache to store the page read by the database reading device;
    a page cache reading device to read the object for which the access request is received from the page stored in the page cache;
    an object cache to store the object read by the page cache reading device;
    a page status information storage device to store the page status information indicating whether the page stored in the page cache is consistent with the page in the database corresponding to the page;
    an object status information storage device to store the object status information indicating whether the object stored in the object cache is consistent with the object in the database corresponding to the object, and
    a status information synchronizing device to execute a synchronization process that makes the page status information stored in the page status information storage device corresponding to the page stored in the page cache consistent with the object status information stored in the object status information storage device corresponding to the object read from the page and stored in the object cache, wherein the status information synchronizing device comprises:
        a database determination device to determine whether the page to be stored in the page cache containing the object for which the access request is received consistent with the page in the database corresponding to the page, and a status information updating device that sets the pare status information of the page to invalid status indicating inconsistency with the database when the database determination device determines inconsistency and sets the object status information that is stored in the object status information storage device corresponding to the object read from the page and stored in the object cache to the invalid status that is a status not guaranteeing consistency with the corresponding object in the database.

8. The database management apparatus of claim 7, wherein the database management apparatus further comprises a server and a client, the server comprising:

a first receiving device to receive an object access request for the database that stores the object, a database reading device, and a first sending device to send the page read by the reading device to the client, the client comprising:

a second sending device to send an object access request from the database to the server, and a second receiving device that receives the page sent by the first sending device of the server in response to the access request sent by the second sending device and writes the page in the page cache, the page cache reading means, the page status information storage device, and the status information synchronization device.

9. A database management method to be applied to a database management apparatus having a page cache to store a page that comprises data of a fixed length containing an object read from the database that stores the object and an object cache to store the object read from the page cache, the method comprising the steps of:

receiving an access request for the object in the database;

determining whether the page in the page cache containing the object for which the access request is received is consistent with the page in the database corresponding to the page;

declaring the page in the page cache invalid in the case of inconsistency;

declaring the object read from the page in the object cache invalid;

reading the page in the database containing the object for which the access request is received to write to the page cache;

declaring the page in the page cache valid;

reading the object for which the access request is received from the page on the page cache;

converting the read object to the object in computable format;

storing the object in the computable format to the object cache; and declaring the stored object in the object cache valid.

10. A database management apparatus comprising:

page cache means for storing a page having a fixed length containing an object read from a database storing the object;

object cache means for storing the object read from the page stored in the page cache means;

page status information storage means for storing page cache status information indicating whether the page stored in the page cache means and the page on the database corresponding to the page are consistent;

object status information storage mans for storing object cache status information indicating whether the object stored in the object cache means and the object in the database corresponding to the object are consistent; and status information synchronizing means for executing a synchronization process to make the page cache status information stored in the page status storing means corresponding to the page stored in the page cache means consistent with the object cache status information stored in the object status information storage means corresponding to the object that is read from the page and stored in the object cache means, wherein the status information synchronizing means comprises:

database determination means for determining whether the page to be stored in the page cache means containing the object for which the access request is received consistent with the page in the database corresponding to the page, and status information updating means for setting the page status information of the page to be invalid status indicating inconsistency with the database when the database determination means determines inconsistency and sets the object status information that is stored in the object status information storage means corresponding to the object read from the page and stored in the object cache means to the invalid status that is a status not guaranteeing consistency with the corresponding object in the database.

11. The database management apparatus of claim 10, wherein the status information synchronizing means executes the synchronization process to make the page status information stored in the page status information storage means consistent with the object status information stored in the object status information storage means based on the results of determining whether the page stored in the page cache means is consistent with the page on the database corresponding to the page.

12. The database management apparatus of claim 11, wherein the status information synchronizing means sets the object status that corresponds to all of the objects read from the page and stored in the object cache means to an invalid status indicating that the objects do not necessarily correspond with corresponding objects in the database when the page status stored in the page status information storage means is set to an invalid status indicating that the page stored in the page cache means is inconsistent with the page in the database corresponding to the page.

13. The database management apparatus of claim 10, wherein the page cache stores the page in a storage format that is suitable to store the data, the object cache means storing the object in a computable format that is suitable to process data, the database management apparatus further comprises conversion means for reading the object in storage format from the page cache means, for converting the format to computable format and for storing the format in the object cache means.

14. The database management apparatus of claim 10, wherein the page status information storage means contains, as a page status information, a valid status that indicates that the page stored in the page cache means is consistent with the page stored in the database corresponding to the page, an invalid status that indicates inconsistency and a unlock status that indicates that the access request is not received for the object contained in the page, wherein the object status information storage means contains, as object status information, a valid status that indicates that the object stored in the object cache means is consistent with the object stored in the database corresponding to the object, an invalid status that indicates inconsistency and an uninitialized status that indicates that a region is secured in the object cache means to read an object.

15. The database management apparatus of claim 10, wherein when the status information synchronizing means receives an access request for the object, the status information synchronizing means makes the page status information that is stored in the page status information storage means corresponding to the page stored in the page cache means including the object for which the access request is received consistent with the object status information that is stored in the object status information storage means corresponding to the object read from the page and stored in the object cache means.

* * * * *